United States Patent [19]
Mayer

[11] Patent Number: 4,973,207
[45] Date of Patent: Nov. 27, 1990

[54] FASTENING ASSEMBLY

[75] Inventor: Burkhard Mayer, Waldachtal, Fed. Rep. of Germany

[73] Assignee: Fischerwerke Artur Fischer GmbH & Co. KG, Tumlingen/Waldachtal, Fed. Rep. of Germany

[21] Appl. No.: 472,205

[22] Filed: Jan. 29, 1990

[30] Foreign Application Priority Data

Feb. 1, 1989 [DE] Fed. Rep. of Germany ... 8901067[U]

[51] Int. Cl.⁵ ........................ F16B 13/04; F16B 13/06
[52] U.S. Cl. ........................................ 411/32; 411/55
[58] Field of Search ............... 411/32, 33, 54, 55, 411/60, 61, 70, 24, 26

[56] References Cited

U.S. PATENT DOCUMENTS

| | | | |
|---|---|---|---|
| 4,484,848 | 11/1984 | Ott | 411/55 |
| 4,640,654 | 2/1987 | Fischer et al. | 411/55 |
| 4,789,284 | 12/1988 | White | 411/55 X |

FOREIGN PATENT DOCUMENTS

| | | |
|---|---|---|
| 2745805 | 4/1979 | Fed. Rep. of Germany . |
| 2815998 | 10/1979 | Fed. Rep. of Germany . |
| 3707510 | 9/1988 | Fed. Rep. of Germany . |
| 2257748 | 8/1975 | France . |
| 575520 | 5/1976 | Switzerland . |

Primary Examiner—Neill R. Wilson
Attorney, Agent, or Firm—Michael J. Striker

[57] ABSTRACT

A plug assembly that comprises a bolt having a cone portion at one end thereof and an external thread at another end thereof, a sleeve for mounting over the bolt and having an expansible portion at an end thereof which is adjacent to the one end of the bolt, and a tubular member screwed over the bolt until its engagement with an end of the sleeve which is remote from the expansible region for securing the plug assembly against rotation.

2 Claims, 2 Drawing Sheets

FASTENING ASSEMBLY

BACKGROUND OF THE INVENTION

The invention relates to a fastening assembly especially for panels with cavities, which comprises a bolt having a cone at the lower end thereof and an external thread in the upper region thereof, and a sleeve having an expansible region at its lower end.

Expansible fastening assemblies intended for use in drilled holes in masonry having a conical undercut portion, are known. The positive anchoring of these fastening assemblies is effected as follows: a bolt having a cone at its lower end is hammered into the drilled hole together with a sleeve mounted on the bolt. When the bolt reaches the base of the drilled hole, the expansible region of the sleeve expands over a region of the cone by being hammered part of the way over the cone into the drilled hole. Upon fastening by screwing the object to be fastened at the mouth of the drilled hole, the bolt with the cone is then withdrawn into the sleeve until a form-locking interconnected expansion of the expansible region of the sleeve in the undercut drilled hole has been achieved.

A disadvantage of this type of anchoring of a fastening assembly consists in that, especially between a phase taking place when the sleeve is hammered in completely, and the phase in which it is caused to expand by a nut screwed on the bolt with a rotary screwdriver, there is no means for securing a fastening element against falling out. Such means proves necessary, however, especially in the case of vertical drilled holes in ceilings and so on. In addition, in the case of a fastening element not having been hammered completely into the drilled hole, there is a danger of an anchoring assembly by which the object is to be secured, not resting flush against the wall or ceiling. Finally, in the case of the anchoring of such a fastening assembly in a wall or ceiling area in which there are cavities, there is a danger that the bolt cone will not reach the drilled-hole base and, hence, will turn during the screwing of the nut, and a form-locking expansion in the drilled hole will not be ensured.

SUMMARY OF THE INVENTION

The object of the invention is to provide a fastening assembly for panels with cavities that is simple to mount and that has means for securing the fastening assembly against elements falling out during the mounting operation.

The object of the invention is achieved by providing means for securing the fastening assembly against rotation and which can be screwed over the cone bolt until it engages one end face of the sleeve to ensure that, regardless of whether it is being fastened in a cavity region or in a beam region, the fastening assembly can be securely anchored. Turning of the bolt in the sleeve provided with an expansible region during the screwing operation that takes place during mounting of an object, is ruled out as a result. At the same time, elongated longitudinal ribs located on the outer surface of the tubular portion of the means for securing against rotation, secure the sleeve against possible rotation during the screwing operation.

The fastening assembly for panels with cavities is preferably made of resilient plastic materials. As a result, compensation of tolerances is achieved during the hammering-in operation. Projection above the hole mouth is prevented especially by the fact that, because of their nature, the means for securing against rotation is partially deformed during hammering-in. The mounting of the means for securing against rotation flush with the surface located in the region of the mouth of the drilled hole, is also assisted by the fact that the tubular portion of such means has a reduced bore diameter only in its central region. As a result, a slight deformation at the end edges of the tubular portion is possible.

The risk of the fastening assembly becoming detached from the bore in the wall or ceiling before the form-locking expansion of the expansible region of the sleeve in the 10 drilled hole, that takes place during mounting, is also eliminated by the means for securing the conical bolt against rotation.

The present invention both as to its construction so to its method of operation, together with additional objects and advantages thereof, will be best understood from the following detailed description of specific embodiments when read in connection with the accompanying drawings.

DETAILED DESCRIPTION OF THE PREFERRED EMBODIMENTS

Figure 1:
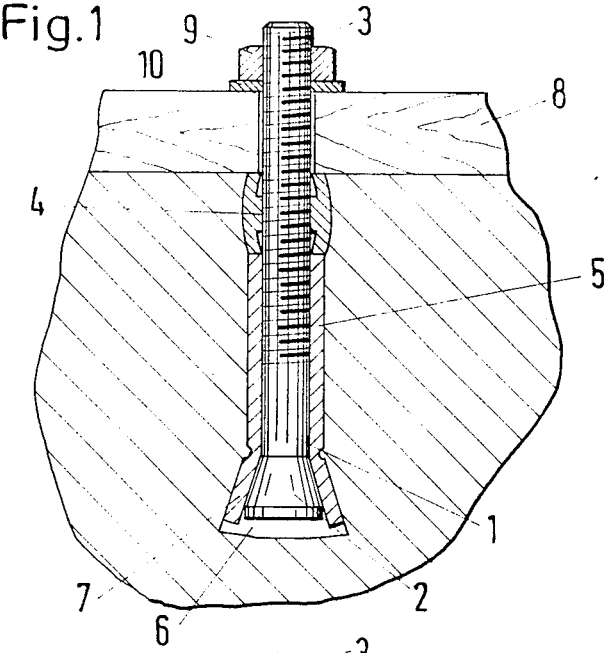
FIG. 1 shows a partial cross-sectional view of a fastening assembly according to the present invention located in a drilled hole having an undercut.

FIG. 1 shows a fastening assembly according to the invention for panels having cavities. The fastening assembly comprises a bolt 1 at the end of which a cone 2 is formed. In its upper region, the bolt 1 has an external thread 3. The fastening assembly further comprises means 4 for securing the assembly against rotation. The securing means is provided with longitudinal ribs and is screwed over the region of the bolt 1 provided with an external thread until the securing means engages a cylindrical sleeve of the fastening assembly. This fastening asssembly for panels with cavities is hammered into a predrilled hole 6 provided with an undercut. When the cone 2 reaches the base of the drilled hole 6, further strokes of the hammer cause the expansible region 7 of the sleeve 5 to expand over the cone 2 of the bolt 1. When an object 8 to be fastened and securing to the panel, is attached thereto by means of a nut 9 and a stop ring 10 with a screwdriver or socket spanner that fits into the nut 9, the expansible region 7 of the sleeve 5 expands positively in the undercut drilled hole 6 in a form-locking manner. During mounting of the object, the securing means 4 prevents rotation of the bolt 1, since the securing means 4 has an internal thread that engages the external thread 3 of the bolt 1.

Figure 2:
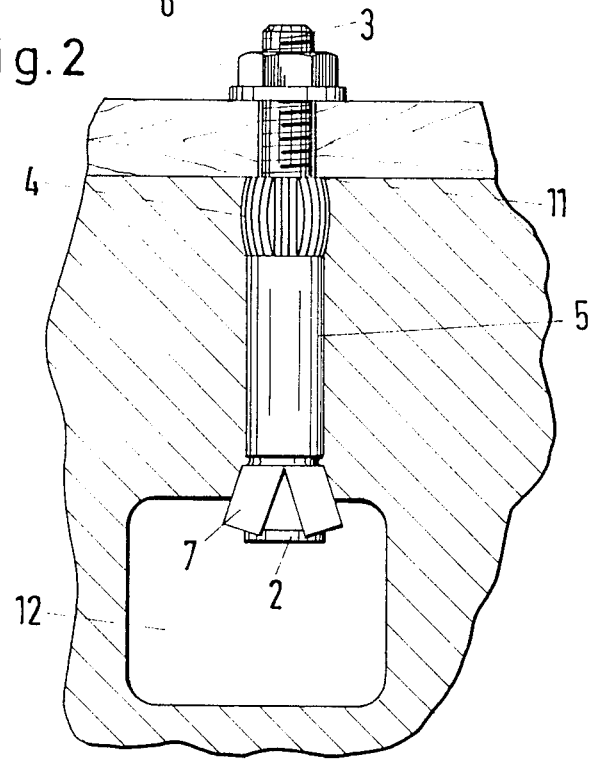
FIG. 2 shows an elevational view of a fastening assembly according to the invention mounted in a panel having a cavity region at the base of the drilled hole.

The fastening assembly for panels with cavities which is shown in FIG. 2, is similar to that of FIG. 1 and also comprises a bolt 1 provided with an external thread 3 and a cone 2. The bolt is screwed in with the cone 2 being completely located in the expansible region 7 of the sleeve 5. During mounting of the fastening assembly, the means 4 for securing against rotation were hammered in flush with the region surrounding the drilled hole 11. Since in the present case, the fastening assembly inserted into the drilled hole encounters a cavity region 12 at the base of the drilled hole, there is a danger that, when a nut 9 is screwed on, the bolt located in the sleeve 5 will turn at the same time, thus preventing full expansion of the expansible region 7 of the sleeve. and; thus, endangering a secure anchoring. Turing of the fastening assembly during mounting of the object is prevented by the securing means 4 which is provided with an internal thread engaging the outer thread of the bolt. Thus, expansion of the expansible region 7 to provide secure anchoring is ensured in this case also.

Figure 3:
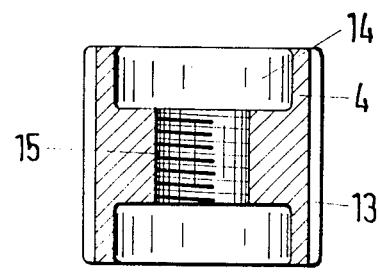
FIG. 3 shows a cross-sectional view of means for securing the fastening assembly according to the invention against rotation.

FIG. 3 shows that the means 4 for securing the fastening assembly against rotation shown in FIG. 3, have on the outer surface thereof longitudinal ribs 13 that provide for secure anchoring in the drilled hole of the securing means. The bore 14 in the tubular portion of the securing means 4 has a reduced diameter in its central region. In that region, the securing means 4 is provided with an internal thread 15 which allows the securing means 4 to be screwed on over the external thread 3 provided in the upper region of the bolt 1.

While the invention has been illustrated and described as embodied in a fastening assembly for panels with cavities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A fastening assembly comprising a bolt having a cone portion at one end thereof and an external thread at another end thereof opposite to said one end; a sleeve for receiving said bolt and having an expansible portion at an end thereof adjacent to said one end of said bolt; and means for securing the fastening assembly against rotation mounted over said another end of said bolt and engaging an end of said sleeve which is remote from said expansible portion, said securing means comprising a tubular member having an outer surface, a plurality of longitudinal ribs formed thereon, a bore including opposite end regions having a first diameter and a central region located between said opposite end regions and having a second diameter which is less than said first diameter of said opposite end regions, and a wall portion defining said central region and having a internal thread for engaging said external thread of said bolt.

2. A fastening assembly as set forth in claim 1, wherein said securing means is formed of a resilient plastic material.

* * * * *